UNITED STATES PATENT OFFICE.

MORRIS KASSER, OF SAN FRANCISCO, CALIFORNIA.

PROCESS FOR PRESERVING EGGS.

1,264,657.           Specification of Letters Patent.     Patented Apr. 30, 1918.

No Drawing.       Application filed May 14, 1917. Serial No. 168,885.

*To all whom it may concern:*

Be it known that I, MORRIS KASSER, a citizen of the United States, residing in the city and county of San Francisco and State of California, have invented new and useful Improvements for Processes for Preserving Eggs, of which the following is a specification.

The object of this invention is to provide an improved process for preserving eggs in a pure and edible condition for a long period of time.

Egg deterioration is due to several causes the chief one of which is absorption of bacteria, foreign flavors and odors from the adjacent atmosphere through the pervious shell; the bacterial action upon the contents of the eggs producing a noticeable deterioration.

The pores of the shell also tend to permit evaporation of the moisture from the egg producing what is commonly termed "shrunken eggs".

The present invention has for its object the closing of the pores to prevent evaporation of the egg contents as well as to prevent the entrance of foreign odors and flavors from the atmosphere and bacteria upon the shell itself.

In the present state of the art, eggs are preserved by a process wherein the eggs are first subjected for a brief period of about ten seconds to a temperature of about 100 degrees F. to temper the egg shells. The eggs are then removed and subjected to an immersion at a temperature considerably above the temperature of boiling water. During the period between and after the immersion the eggs are exposed to the atmosphere with the pores in a slightly expanded condition. It is during this period that some of the bacteria and foreign flavors and odors of the atmosphere are drawn into the eggs through the pores by the expansion of the egg, after which the eggs are again immersed into the higher temperatured immersion or solution and the bacteria and flavors are practically sealed within the shell, whereas the process is designed to prevent the entrance of the said bacteria and foreign flavors.

The present invention consists mainly in retaining the eggs within the sealing solution while the bacteria are being destroyed and the pores of the shell sealed to prevent evaporation of the egg contents and the entrance of foreign flavors and odors.

In the process the eggs are immersed in a sealing solution consisting of cotton-seed oil and linseed oil. The temperature of the solution is gradually raised to a sufficient temperature to gradually expand the egg shell and the pores whereby the sealing solution will be drawn into said pores.

The temperature is then gradually lowered, the eggs meanwhile being continually immersed or submerged, to gradually cool and thereby contract the shell and pores to compress or pack the sealing solution within the pores and thereby effectively close and seal the egg against the entrance of bacteria, foreign flavors and odors from the adjacent atmosphere.

The highest temperature to which the sealing solution is raised is not sufficient to coagulate the albumen of the egg but the period of time is sufficient to destroy bacteria on the exterior of the shell, and to expand the shell and pores therein a sufficient extent to permit such expansion of the egg to draw the sealing solution into expanded pores.

The main factor which is of extreme importance is to retain the immersion of the eggs while the pores are expanded or being expanded to prevent the entrance of bacteria or foreign odors from the atmosphere.

Should the eggs be first immersed to expand the pores and then withdrawn from the solution and exposed to the atmosphere, the expanding condition of the egg would cause the surrounding atmosphere with its attending bacteria and odors to be drawn or sucked into the egg. It is obvious that with my improved process of retaining the immersion of the eggs throughout the process that the bacteria are subjected to the sealing solution for a sufficiently long period to be destroyed. It is also evident that the continued immersion of the egg until cooled will prevent the absorption from the atmosphere of foreign elements that would tend to hasten the deterioration of the egg contents, as well as having the further advantage of compressing or packing the sealing solution within the pores to effectively seal the egg shell.

Having thus described my invention what

I claim as new and desire to secure by Letters Patent is—

1. The process of preserving eggs which consists in filling the pores of the shell by gradually expanding the egg and the said pores in a sealing element or solution, and then gradually raising the temperature of the element or solution.

2. The process of preserving eggs which consists in gradually expanding the eggs by immersing them in a sealing solution composed of cotton-seed and linseed oil and gradually heating the solution and gradually cooling the same whereby the expansion of the shell will expand, and the subsequent contraction will close, the pores, to receive and retain the sealing solution.

3. The process of preserving eggs which consists in immersing the eggs in a comparatively cool sealing solution and keeping them immersed while the temperature of the solution is gradually raised to expand the pores of the shell to receive the sealing solution and then gradually lowered to contract the pores and thereby seal the sealing solution within the pores.

4. The process of preserving eggs which consists in immersing the eggs in a comparatively cool sealing solution composed of cotton-seed and linseed oil and keeping the eggs immersed while the temperature of the solution is gradually raised to expand the pores of the shells to receive the sealing solution and then gradually lowering the temperature of the solution to contract the pores and thereby pack or compress the sealing solution within said pores.

In witness whereof, I hereunto set my signature.

MORRIS KASSER.